J. H. WOLFORD.
PAN LIFTER.
APPLICATION FILED MAY 8, 1914.
1,148,646.
Patented Aug. 3, 1915.
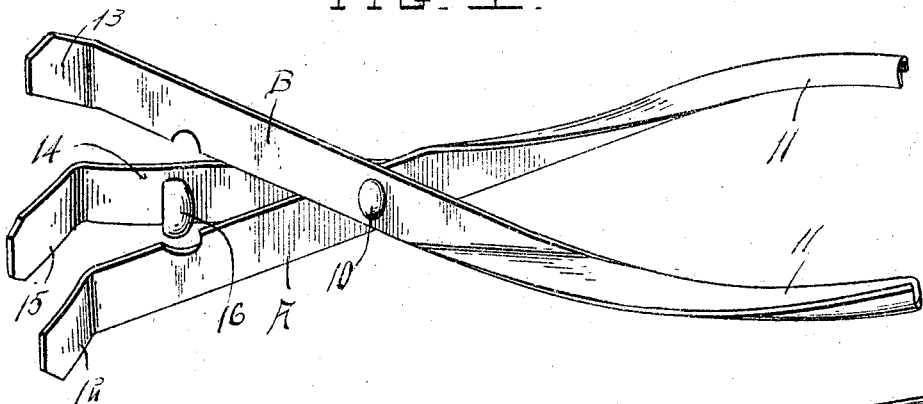
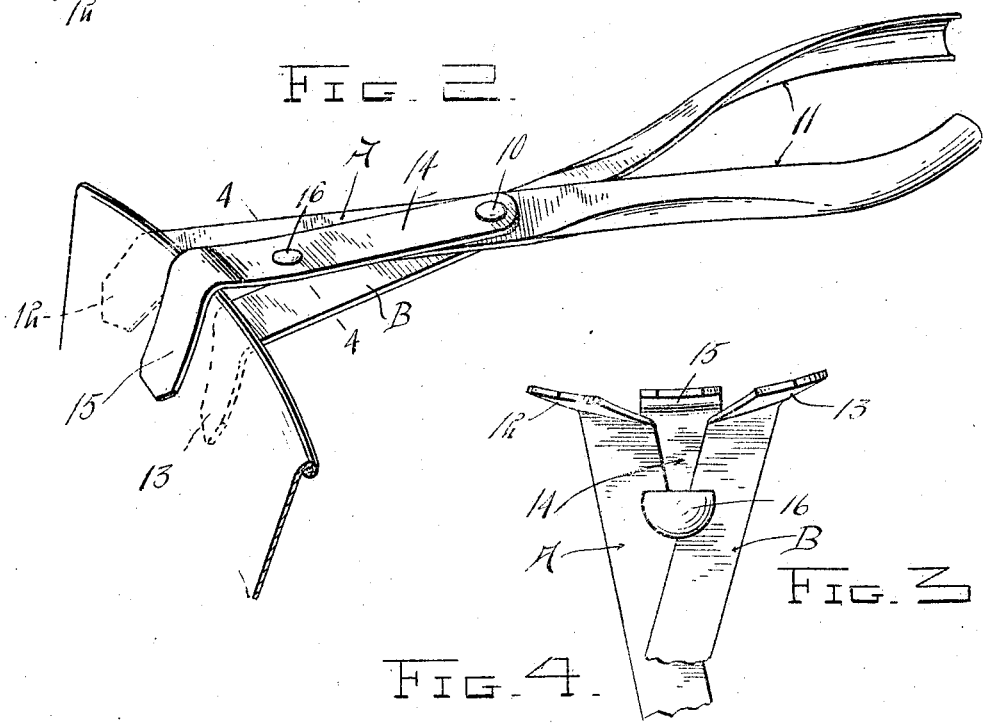
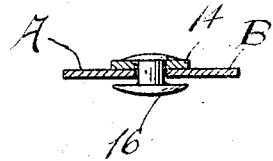
Witnesses
J. C. Simpson
Henry T. Bright
Inventor
J. H. Wolford
By Chandler & Chandler
Attorneys

UNITED STATES PATENT OFFICE.

JOSEPH HOWARD WOLFORD, OF CLIFTON STATION, VIRGINIA.

PAN-LIFTER.

1,148,646.  Specification of Letters Patent.  Patented Aug. 3, 1915.

Application filed May 8, 1914. Serial No. 837,326.

*To all whom it may concern:*

Be it known that I, JOSEPH H. WOLFORD, a citizen of the United States, residing at Clifton Station, in the county of Fairfax, State of Virginia, have invented certain new and useful Improvements in Pan-Lifters; and I do hereby declare the following to be a full, clear, and exact description of the invention, such as will enable others skilled in the art to which it appertains to make and use the same.

This invention relates to pan lifters.

The object of the invention resides in the provision of a device of the character named through the instrumentality of which a heated pan may be removed from a stove with ease and facility and without danger of burning the hand.

A further object of the invention resides in the provision of a device of the character named which will be simple in construction, efficient in use and which can be manufactured at a relatively small cost.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a perspective view of a pan lifter constructed in accordance with the invention; Fig. 2, a perspective view looking at the opposite sides of the lifter and showing same applied to a pan; Fig. 3, a view looking at the outer ends of the pan engaging fingers with the latter in closed position, and Fig. 4, a section on the line 4—4 of Fig. 2.

Referring to the drawing the improved pan lifter is shown as comprising arms A and B connected together intermediate their ends by a pivot pin 10. These arms A and B terminate at one end in handle portions 11 respectively and at their other ends in laterally directed pan engaging fingers 12 and 13 respectively. These fingers 12 and 13 when disposed at the limit of their movement toward each other lie substantially with respect to their transverse dimensions in the plane of the side of a cylinder so as to readily bear against the outer side of a pan having a substantially cylindrical shape. Pivotally mounted on the pin 10 is an arm 14 the free end of which terminates in a pan engaging finger 15 disposed outwardly of the fingers 12 and 13. Projecting from the arm 14 between the arms A and B is a stud 16 which is adapted to engage in recesses formed in the arms A and B to limit the movement of the ends of the arms A and B carrying the fingers 12 and 13 toward each other. In the use of the device the ends of the arms A and B carrying the fingers 12 and 13 are spread apart and the finger 15 of the arm 14 is engaged against the inner face of the side of the pan. The arms A and B are then operated to force the fingers 12 and 13 toward each other when they will engage the outer face of the side of the pan and the latter will then be securely clamped between the finger 15 and the fingers 12 and 13 when it may be lifted and carried to a suitable location as desired. It will also be noted that the stud 16, when the device is in gripping relation to a pan overlies the arms A and B so that any tendency of the arm 14 to rise and slip over the top of the pan is prevented.

What is claimed is:—

A pan lifter comprising a pair of arms, a pivot pin connecting said arms intermediate of their ends, pan engaging fingers formed on corresponding ends of said arms, a third arm pivotally mounted on said pivot pin and having its free end terminating in a pan engaging finger disposed outwardly of the pan engaging fingers carried by the first named arms, and means carried by the third arm for limiting the movement toward each other of those ends of the first named arms which carry pan engaging fingers.

In testimony whereof, I affix my signature, in the presence of two witnesses.

JOSEPH HOWARD WOLFORD.

Witnesses:
R. R. BUCKLEY,
D. W. BUCKLEY.